Aug. 11, 1936.   J. LYNN   2,050,890
WELDING AND GRINDING GOGGLES
Filed June 11, 1935   2 Sheets-Sheet 1

INVENTOR
John Lynn

Aug. 11, 1936.  J. LYNN  2,050,890
WELDING AND GRINDING GOGGLES
Filed June 11, 1935   2 Sheets-Sheet 2
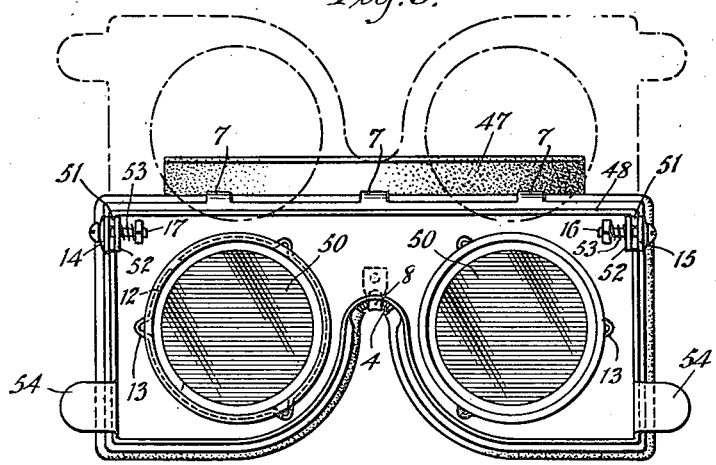
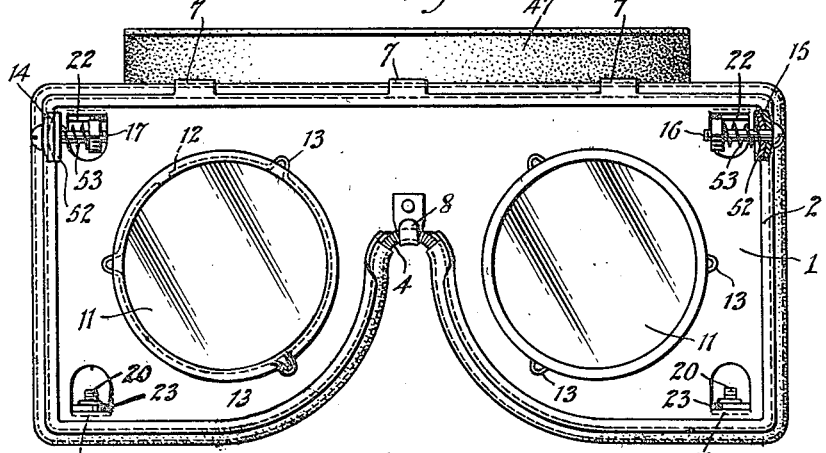
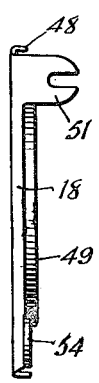
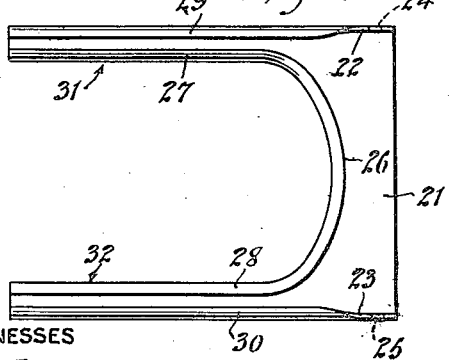
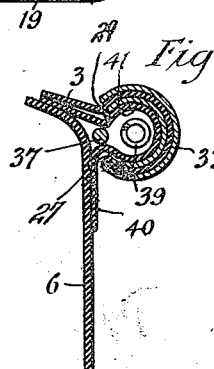
WITNESSES
Edw. Thorpe
A. L. Kitchin
INVENTOR
John Lynn
BY
Munn, Anderson & Liddy
ATTORNEY Patented Aug. 11, 1936

2,050,890

UNITED STATES PATENT OFFICE 2,050,890

WELDING AND GRINDING GOGGLES

John Lynn, Alice, Tex.

Application June 11, 1935, Serial No. 26,051

6 Claims. (Cl. 2—14)

This invention relates to eye-protecting devices, and has for an object to present an improved form of goggles which may be used for many purposes, as, for instance, for protecting the eyes when welding or when grinding, the structure being such as to be readily adjusted for either kind of work.

Another object of the invention is to provide goggles which will not only protect the eyes during welding or grinding, or for other use, but will protect the ears and parts of the face.

An additional object is to provide protecting goggles wherein the protecting lenses used in welding may be quickly removed or applied.

A further object, more specifically, is to provide goggles having glass protecting members for the eyes and leather or other protecting means for the face, with yielding holding members which may be adjusted whereby the device may be applied to persons with different sized heads and caused to function properly.

In the accompanying drawings—

Fig. 3 is a front view of the goggles when set for use in welding;

Fig. 4 is a view similar to Fig. 3 with the exception of being on an enlarged scale and with the welding lens frame removed;

Fig. 5 is an edge view of the frame carrying the welding lens;

Fig. 6 is an elevation of one of the swinging side plates embodying certain features of the invention;

Fig. 7 is a fragmentary sectional view through Fig. 1 on the line 7—7, the same being on an enlarged scale.

Figure 1:
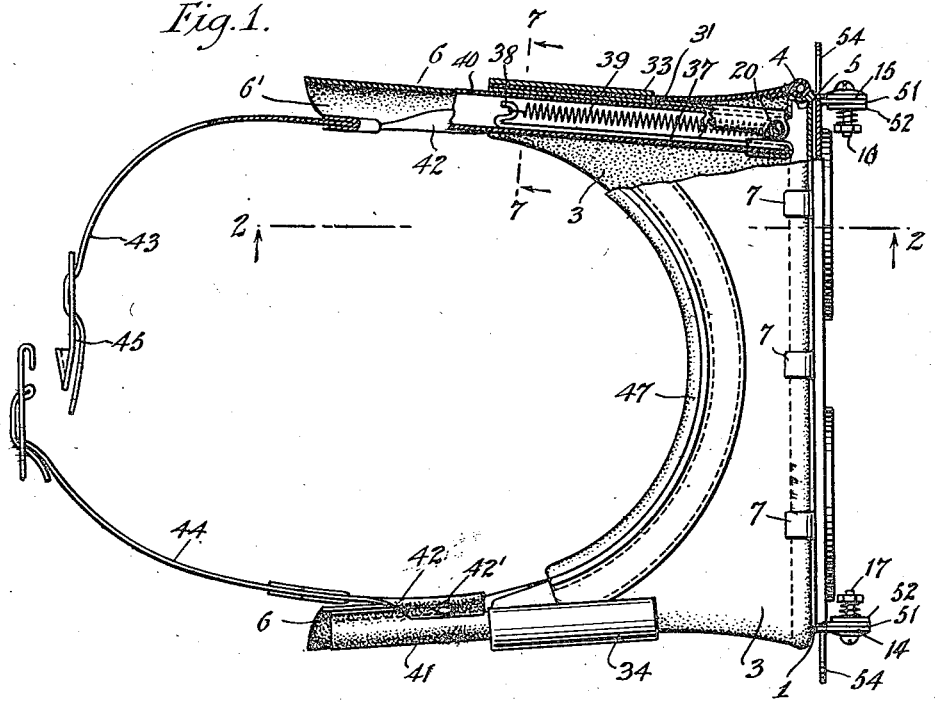
Figure 1 is a top plan view of a device disclosing an embodiment of the invention, a portion being broken away to illustrate how a yielding sliding connection is provided between the holding means and the body of the goggles.

Referring to the accompanying drawings by numerals, 1 indicates a frame which is preferably made from metal and having the edges bent to produce a grooved border or member 2. This frame is notched at the center, as shown in Fig. 4, for accommodating the nose when the device is in use. A protecting casing 3 of leather is arranged with one edge fitted into the groove formed by the border 2. The casing 3 is turned over at one end and provided with a wire coil 4, as shown at the upper part of Fig. 1, so as to present a bead fitting into the groove 5 formed by the border member 2. The casing 3 forms a protecting shield at the top and bottom, as illustrated particularly in Figs. 1 and 2. The casing 3 also extends along the sides somewhat as illustrated at the upper part of Fig. 1 where the ear-protecting members 6 overlap the same, said ear-protecting members also being formed of leather as well as certain other parts as hereinafter fully described.

Figure 2:
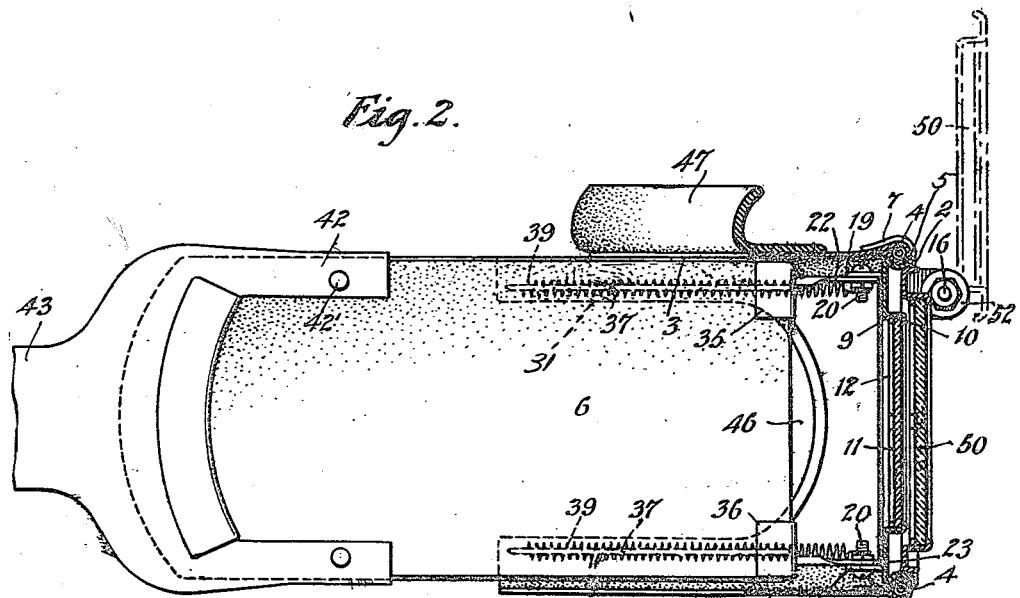
Fig. 2 is a sectional view through Fig. 1 approximately on the line 2—2.

In addition to using the wire coil 4 for holding the leather casing 3 in place, there are provided at the upper part of the frame 1, a number of fingers 7 which are bent over as illustrated in Figs. 1 and 2 so as, in a certain sense, to clinch the respective parts. At the center of the metal frame 1 there is provided a hook 8 over which the wire coil 4 is looped. The metal frame 1 is a solid piece of metal but with certain cut-out portions as hereinafter fully described.

As illustrated in Fig. 2, the frame 1 forms a pair of pressed-up annular members 9 having flanges 10 against which the respective lenses 11 rest, said lenses being held in place by the respective springs 12. Each of the springs 12 has a number of looped portions 13 extending through suitable apertures in the respective flanges 9. The lenses 11 may be clear glass, clear celluloid, or other material as desired. These lenses are used to protect the eyes when grinding an article, as, for instance, with an emery wheel. It is also true that the lenses could be colored if desired.

At the upper part of the frame 1 there are provided pressed-up ears 14 and 15 at the respective ends of the frame for the reception of bolts 16 and 17 which act as pintles for the welding frame 18. In addition there are provided near the lower edge of the frame four pressed-up ears 19 which receive the respective bolts 20, and to these bolts the respective metal side frames 21 are pivoted. As these side frames are identical a description of one will apply to both.

As illustrated in Fig. 6, the frame 21 is provided with upstanding flanges 22 and 23, said flanges being provided with apertures 24 and 25 for the reception of the bolts 20. The central part of the frame 21 is cut away and there is provided a stiffening bead 26 at the front edge which merges into curved flanges 27 and 28 coacting with flanges 29 and 30 to form tubular guides 31 and 32. The side portions of the leather or other flexible frame 3 fit over the swinging side frame 21, as shown at the upper part of Fig. 1, and are clamped to the respective tubular guides 31 and 32 by the respective clamping sleeves 33 and 34, which sleeves are open at one point as shown in Fig. 7. Overlapping the respective frames 21 are the respective ear protectors 6 formed of leather though they could be made from fabric or other material. As illustrated in Fig. 2, each of the ear protectors 6 is substantially rectangular and at the inner end is provided with metal clips 35 and 36 which clamp the inner ends of the respective rods 37. Each of these rods is provided with a hook 38 at the outer end over which one end of a retractile spring 39 is fitted, said spring being connected in any desired manner to the bolt 20. This spring is normally under tension so that the parts remain in their inner position as shown in Fig. 1, but may be readily pulled outwardly therefrom. Connected to each of the ear protectors 6, at the top and bottom thereof, is a leather strap 40, which is provided with a loop 41 slidingly mounted within one of the guides 31 or 32, and in this loop 41 is arranged the spring 39. It will be understood that the loop 41 slides back and forth in the guide 31 or 32, as the case may be, and with it moves the ear protector 6. An anchoring strap 42 is secured by the respective snap fasteners 42' or other means to the respective edges of the ear protectors 6 and connected with these anchoring straps or retaining straps 43 and 44 carrying the parts of the buckle 45, said buckle being adjustable along the respective straps. As illustrated particularly in Fig. 1, the straps 43 and 44 are disengageably secured in place so that, if desired, a workman could use the device as of the spectacles type. However, when these parts are not used, there is provided an opening 6' between the protectors 6 and the ends of the straps 43 and 44. This provides a means for holding the goggles in place by inserting the ears of the wearer through the respective openings 6'. The protectors 6 and the straps are both made from soft leather so that the ears are properly protected when the parts are used as just described. It will be noted that in practice the strap 40, loop 41, rod 37, and spring 39 extend only to approximately the end of member 34 or 33 as the case may be. As the parts beyond the members 33 and 34 are made from flexible leather, the goggles may readily be folded in a rather compact form for carriage by swinging the parts toward each other so that they will overlap.

As illustrated in Figs. 1 and 2, it will be seen that the respective ear protectors 6 may be moved back and forth. The inward movement of the ear protectors in respect to the frame 1 is caused by the respective springs 39 while the outward movement is caused by the pull when using the device. When first adjusting the goggles to the face, the buckle 45 may be adjusted to pull the protector to the position shown in Fig. 2, whereby there will be provided a small opening 46 to permit air to enter. If desired, holes could be provided in the casing 3 or other parts of the device for ventilation. After the device has been once adjusted to the head of the user, a guard 47 is pressed against the forehead so as to eliminate any chance of the edge of the frame 3 cutting the face. With the parts adjusted as just described the device is in condition for use when grinding and for other purposes.

Where it is desired to weld an object and naturally to watch the action during the welding, it is necessary to provide additional protection for the eyes, and to do this the welding frame 18, as shown in Fig. 5, is applied or moved to the position shown in Figs. 2 and 3. The frame 18 is substantially the same shape as the frame 1 but is removably mounted thereon and is not provided with the edge or border 2 but is provided with a turned-up edge 48 which fits within the member 2. The frame 18 is provided with a pair of pressed-out portions 49, which are formed similarly to the flange 9 and associated parts so as to receive lenses 50. The lenses 50 may be smoked glass or glass colored in any desired way to protect the eyes against the light produced during the welding operation. In welding an object not only is there an intense light produced but very fine particles are thrown off during the welding operation, and these particles entering the eye will injure the eye to a large extent. By providing the lens 50 the eye is protected not only against the brilliant light of the welding but against the particles thrown off during the welding operation, and yet the operator may readily see what results he is securing. The frame 18 is bodily applied and bodily removed. When it is applied the dished or concaved slotted ears 51 are slid over the respective bolts 16 and 17 between the respective concave washers 52, which washers are compressed by the respective springs 53 so as to provide the desired tension whereby the frame 18 may be swung upwardly to the position shown in dotted lines in Figs. 2 and 3, and then downwardly to its operative position. It will be seen from Fig. 4 that the respective springs 53 surround the respective bolts 16 and 17 and press at one end against nuts carried by the bolts and at the other end against the respective washers so as to give the washers a tendency at all times to press against the respective ears 14 and 15. Immediately after the welding operation is completed the operator instead of removing the goggles will merely raise the frame to the dotted-line position shown in Fig. 2 and may then see through the lenses 11. Immediately before starting a second operation the operator will swing the frame 18 down to its operative position. Where the device is used for some other purpose than welding, the frame 18 may be quickly removed. It will be noted that the frame 18 may be applied or removed without the use of tools and will automatically stay in the adjusted position to which it is placed.

When the device is in use the frame 1 is preferably spaced a short distance in front of the face and is held in that position by reason of the fact that the forehead of the person is resting against the bumper or protector 47, but all parts which come in contact with the face are formed from leather or similar material, as, for instance, fabric, and, consequently, even though the device becomes heated there will be no hot metal in contact with the face.

When shifting the frame 18 from the full-line position shown in Fig. 2 to the dotted-line position, one or both of the laterally extending ears 54 may be grasped and forced outwardly and upwardly.

I claim:

1. A pair of goggles for use in grinding and welding, including a frame, a pair of substantially transparent lenses carried by said frame, a welding frame having colored lenses arranged in line with the first-mentioned lenses, means for disengageably mounting the welding frame in position, said means including a pivotal pin carried by the first mentioned frame at each end near the top, a notched ear on said welding frame at each end and spring actuated washers pressing against said ears for resisting independent movement of the welding frame, and means for supporting said frames with their lenses on the head of a person when the device is in use.

2. An eye-protecting device of the character described, including a lens-supporting frame, a pair of side frames hingedly connected with the lens-supporting frame, sliding ear protectors carried by the respective hinged frames, means for holding the device on the head of a person, and removable means for supporting colored lenses in front of the first-mentioned lens-supporting frame.

3. An eye protector including a substantially rectangular lens-supporting frame having a pair of spaced lenses, a flexible covering connected with said frame and extending therefrom adapted to cover part of the face of the person using the device, a pair of swinging side frames connected to the first-mentioned frame, a sliding ear protector connected to each of the swinging frames, a spring for each of said ear protectors for normally holding the same against movement in one direction, and retaining straps connected to said ear protectors.

4. An eye protector of the character described including a lens-carrying frame provided with a pair of lenses, means for maintaining said frame on the head of the person using the protector, a second frame mounted on the first-mentioned frame, said frame having a pair of notched ears, the respective ears being at the respective ends of the frame adjacent one edge thereof, a journal pin at each end of the first mentioned frame positioned to be engaged by said notched ears for disengageably connecting said second mentioned frame with the first mentioned frame, said pins and notched ears permitting a swinging movement of the second-mentioned frame in respect to the first-mentioned frame, spring actuated means carried by each of said pins for creating a friction between said ears and said pins for resisting movement of said second mentioned frame, and a pair of lenses carried by said second-mentioned frame arranged in alignment with the first-mentioned lenses.

5. An eye protector of the character described including a lens-carrying frame provided with a pair of lenses, means for mounting said frame on the head of a person using the device, said frame having a pair of upstanding ears, a bolt extending through each of said ears, a washer mounted on each of said bolts, a spring surrounding each bolt acting on the respective washers and bolts for causing the washers to press against said ears, a second frame having bifurcated ears, said bifurcated ears being adapted to be pressed between said first-mentioned ears and said washer so as to straddle said bolts, whereby the second-mentioned frame is swingably and removably mounted on the first-mentioned frame, and a pair of lenses carried by the second-mentioned frame, said last-mentioned lenses being in alignment with the first-mentioned lenses.

6. An eye protector of the character described including a lens-carrying frame having a pair of lenses, a pair of side frames hingedly connected with said lens-carrying frame, each of said side frames having upper and lower tubular guides, an ear protector arranged interiorly of each of said side frames, a tubular member connected with each of said ear protectors, said last-mentioned tubular members slidingly fitting into the tubular members of the side frames, said tubular members of the side frames having longitudinally positioned slots through which part of the second-mentioned tubular members extend, a rod having one end connected rigidly to the end of the respective ear protectors nearest to said lens-carrying frame, said rods at the opposite end having hooks, a spring connected to said lens-carrying frame and extending longitudinally for almost the full length of the tubular members connected with said ear protectors, said spring being interlocked with said hooks so as to resiliently hold the ear protectors with one of their respective ends adjacent the lens-carrying frame, and retaining straps connected with said ear protectors, said retaining straps when in use being adapted to pass across the back of the head.

JOHN LYNN.